April 20, 1954 J. N. SHIVE 2,676,228
CONDITIONING OF SEMICONDUCTOR TRANSLATORS
Filed Oct. 6, 1951
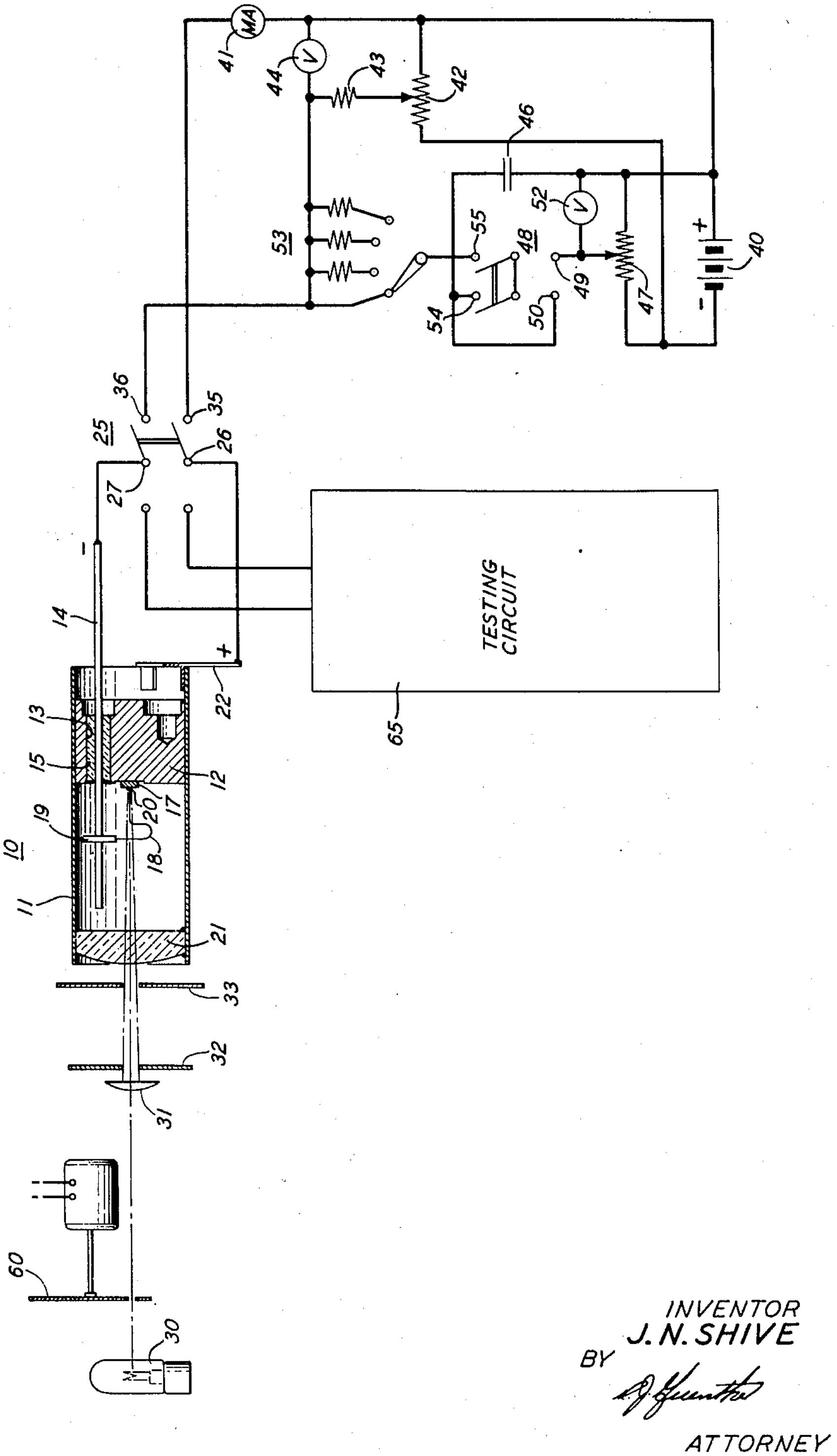
INVENTOR
J. N. SHIVE
BY [signature]
ATTORNEY Patented Apr. 20, 1954 2,676,228

UNITED STATES PATENT OFFICE 2,676,228

CONDITIONING OF SEMICONDUCTOR TRANSLATORS

John N. Shive, Plainfield, N. J., assignor to Bell Telephone Laboratories, Incorporated, New York, N. Y., a corporation of New York Application October 6, 1951, Serial No. 250,159

7 Claims. (Cl. 201—63)

This invention relates to the conditioning of light responsive semiconductor translating devices and more particularly to methods of improving the electrical characteristics of such devices.

Light responsive translating devices comprising a semiconductor body such as a silicon or germanium wafer, an ohmic connection, the base connection, to a portion of the body and a connection having non-linear conduction characteristic, the collector connection, to another portion of the body have been disclosed in my Patent 2,560,606 which issued July 17, 1951. The output of this type device is taken from the base and collector connections and can be modified by the incident light on the surface of the body in the vicinity of the collector. In the process of manufacturing these light responsive translators, hereafter referred to as "phototransistors," an electrical conditioning or forming has been employed to improve their electrical characteristics as light responsive translators. One forming method which has been used is similar to that which is applied to semiconductor diodes wherein energy is applied to the collector in its direction of low conductivity to effect some change, as yet not completely understood, in the characteristics.

An object of this invention is to improve phototransistors. More specific objects are to improve the methods of forming phototransistors, make the forming process amenable to control, and to reduce variations in formed phototransistors.

A feature of this invention resides in forming the collector connection of a phototransistor by the application of electrical energy thereto while minority charge carriers are injected into the semiconductor body in the vicinity of the collector connection. The term "minority charge carriers" as employed throughout this specification refers to those charge carriers, holes or electrons, which do not normally contribute appreciably to the process of extrinsic conduction in the semiconductor.

Another feature resides in forming a phototransistor collector while light is directed on the semiconductor body in the vicinity of the collector connection. Minority charge carriers are liberated in the semiconductor body by incident light.

In one embodiment of this invention, phototransistors are biased with a direct current in the direction of high resistance through the collector, a relatively strong light, of the order of 4.0 millilumens, is directed on the semiconductor surface in the vicinity of the collector connection, and an electrical pulse is superimposed on the collector current in the direction of high resistance. The unit is then tested to determine whether it meets the criteria for acceptable units and if not it is subjected to further forming at higher energies.

Other objects and features of this invention will be appreciated from a reading of the following detailed description with reference to the accompanying drawing showing a sectioned elevation of one form of phototransistor to which this invention is applicable mounted in a schematically represented optical bench and arranged for connection to forming and test circuits.

In the drawing, an assembly 10 comprising a combined phototransistor unit and lens tube 11 is shown. The phototransistor comprises a conductive plug 12 of some material such as brass, having an off-center bore 13 parallel to its axis through which a collector pin 14 passes. The collector pin is isolated from the plug by a glass bushing 15 sealed to the wall of the bore and to the pin by any well-known fusing technique. A semiconductive wafer 17, which has been prepared by the usual methods of casting an ingot, slicing it, polishing the slice surfaces, and dicing the slice, is secured to the center of the plug face by solder. The exposed surface of this wafer is highly polished as by both mechanical and chemical means. A pointed wire 18 having a tab 19 on one end by which it is welded to collector pin 14, and an intermediate C-shaped spring section, is located centrally on the exposed wafer surface to form a collector connection. The collector point contact is fixed on the semiconductor surface by a mass 20 of Glyptal clear varnish No. 1202 obtained from General Electric Company which also serves as a reflection reducing coating and, by virtue of the meniscus shape it assumes around the contact wire, as a condensing lens. Light entering the end of the lens tube 11 is condensed on the surface of the semiconductor wafer 17 by lens 21, which is maintained in position in any convenient manner. Electrical connection to the semiconductor body, the base connection is completed through the ohmic solder contact to the plug 12, through the lens tube 11 to the soldering lug 22 which is secured to the tube 11 as by welding.

The phototransistor-lens tube assembly is connected to a double pole double throw switch 25. The base is connected to pole 26 and the collector is connected to pole 27 so that the switch may be closed to the right to connect the phototransistor to a forming circuit and to the left to connect the phototransistor to a testing circuit.

The forming and testing arrangements as will be discussed in more detail below both require the application of light to the wafer surface adjacent the collector connection; hence an optical bench is schematically represented to the left of the phototransistor-lens tube assembly in the drawing. This optical bench comprises a light source 30, which gives flux of 4.25 millilumens of 2360° K. color temperature at the unit, a lens 31 for concentrating this flux into a focal spot of approximately one square millimeter through apertured plates 32 and 33. The phototransistor-lens tube assembly 11 is advantageously mounted in a 3-coordinate manipulator (not shown) so that the responsive region of the wafer 17 can be adjusted relative to the focal spot for maximum cell output.

The presence of light on the semiconductive wafer surface in the vicinity of the collector connection liberates minority charge carriers, holes or positive charge carriers in N-type material wherein conduction normally occurs by electrons or negative charge carriers, and these injected carriers control the forming energy to produce a formed region around the collector the characteristics of which are more controlled and more uniform than were attainable heretofore. This liberation of charge carriers simultaneously with the application of forming energy to the collector in any form and by any means is advantageous in producing a controlled forming of light responsive translators.

An assembly 11 constructed and positioned in the optical bench as described above can be electrically formed according to the method of this invention in the circuit connected to poles 35 and 36 of switch 25. This circuit is arranged to supply a direct current to the unit being formed poled so that the collector is biased in the direction of high resistance, negative for a unit having an N-type semiconductive wafer 17. The direct current is supplied over the circuit traced from the positive pole of battery 40 through milliammeter 41 to the base connection and from the negative pole of the battery through potentiometer 42 and series resistance 43 to the collector. The voltage between the collector and base can be observed on voltmeter 44. Means for superimposing pulses in the form of condenser discharges on the collector current is also provided in this circuit. These discharges are obtained by charging condenser 46 from battery 40 through potentiometer 47 when the contacts of switch 48 bridge poles 49 and 50. The charging voltage is adjusted to the desired value on the potentiometer by reference to voltmeter 52. The condenser 46 is discharged through a series resistance in resistance bank 53 and thence through the collector in the direction of high resistance by closing switch 48 across poles 54 and 55.

The parameters of a typical phototransistor forming process for a unit as illustrated having an N-type germanium wafer of 6 ohm-centimeters resistivity and a 5 mil pointed phosphor bronze collector follow: 4.25 millilumens of 2360° K. color temperature light flux are concentrated into a focal spot of approximately one square millimeter having its center as nearly as practicable coincident with the collector. Potentiometer 42 is adjusted so that two milliamperes direct current flows through the collector in the direction of high resistance. Condenser 46 is charged 50 volts in excess of the collector-to-base voltage and discharged through a series resistance of 1000 ohms in resistance box 53. If forming is indicated as by a decrease in collector-to-base voltage when the collector current is adjusted to two milliamperes then the unit is tested to ascertain whether it satisfies the requirements to be met. If the forming has been incomplete further pulses of increased voltage magnitude are applied to the collector, for example in steps of 50 volts up to 300 volts and if forming is still incomplete the series limiting resistance of box 53 is reduced and the condenser discharge series is again run through until forming is complete. In the above forming procedure series limiting resistances of 1000, 500, 100, and zero ohms have been employed.

Various criteria can be chosen in determining the adequacy of forming. For example, the unit can be subjected to forming until a saturation value of collector current has been reached as indicated by a drop to that collector-to-base voltage at which saturation occurs for the light flux on the wafer. This method of forming is disclosed in more detail in the application of A. E. Anderson Serial No. 250,160, filed October 6, 1951. This method of forming can be adapted to an automatic procedure in which stepping switches are associated with the potentiometer 47 controlling the charging of condenser 46 and the series limiting resistances associated with the condenser in discharging it. These stepping switches progressively superimpose small increments of forming energy on the collector current until a predetermined collector-to-base voltage is reached. Voltage responsive means discontinue the application of forming energy at the proper voltage.

Another criterion which lends itself to automatic forming is the dark current of the unit at a fixed value of collector-to-base voltage; this current increases as the unit forms. Where dark current is the criterion, the light on the unit can be masked out intermediate the application of pulses of forming energy by proper orientation of the disc of light chopper 60, and a current responsive terminating means can be associated with the means for automatically applying increments of forming energy. Various other tests can then be applied to the unit while it is in the optical bench by switching to the testing circuit represented at 65 in the drawings. This circuit can be arranged to test speed of response by operating light chopper 60 and the unit can be subjected to various tests when operating into different loads.

It is to be understood that the light intensity ordinarily present during the forming operations of prior phototransistors, normal room light is of the order of a tenth of a millilumen per square millimeter has been found to effect no improvement in the formation of these devices over forming them in total darkness, presumably because essentially no charge carrier liberation occurred. In the methods in accordance with this invention, the light intensity is sufficiently high to liberate appreciable densities of minority carriers. With presently used semiconductors, the lower limit of effective light intensity is about 1 millilumen per square millimeter, or one decimal order greater than normal room light. At present it has been found desirable from the standpoint of control to employ light intensities of about 15 or 20 millilumens per square millimeter in the forming process.

It is to be understood that the above-described forming circuit and process is illustrative of the application of the principles of the invention.

Numerous other arrangements may be devised by those skilled in the art without departing from the spirit and scope of the invention. These include forming processes employing other than electrical pulsing by condenser discharge, including applications of alternating or direct electrical energy to the collector either singly or in combination in pulse form or gradually increasing continuous form.

What is claimed is:

1. The method of permanently altering the electrical characteristics of a light responsive translator having a semiconductor body of one conductivity type and a base and a restricted area, metallic collector connection having an asymmetric conduction characteristic, which comprises liberating minority charge carriers in the body in the vicinity of the collector connection by applying light to that region simultaneously with the application of electrical forming energy to the collector connection.

2. In the method of permanently altering the electrical characteristics of a light responsive translator having a semiconductor body of one conductivity type and a base and a collector connection which comprises applying electrical energy in the reverse direction of conduction to the collector connection, the step which improves the control of said forming energy comprising the application of light in the vicinity of the collector connection simultaneously with the electrical forming of the collector.

3. In the method of permanently altering the electrical characteristics of a light responsive translator having a semiconductor body of one conductivity type and a base and a collector connection which comprises applying electrical energy in the reverse direction of conduction to the collector connection, the step which comprises applying light to the vicinity of the collector connection having a flux density of at least one millilumen per square millimeter simultaneously with the electrical forming of the collector.

4. In the method of electrically forming a light responsive translator having a semiconductor body of one conductivity type and a base and collector connection which comprises applying electrical energy in the reverse direction of conduction to the collector connection, the step which comprises applying of the order of four millilumens of about 2400° K. color temperature light concentrated in a focal spot of approximately one square millimeter in the vicinity of the collector connection simultaneously with the electrical forming of the collector.

5. The method of electrically forming a light modulated semiconductive body to improve its electrical characteristics, said body having a substantially ohmic contact and a non-ohmic contact that comprises applying of the order of 4.25 millilumens of 2360° K. color temperature light to the body in the region of the non-ohmic contact, and applying a pulse of electrical energy in the direction of high resistance to current flow to said body through the non-ohmic contact.

6. The method of permanently altering the electrical characteristics of a light modulated semiconductive translator, said translator having a substantially ohmic contact and a non-ohmic contact that comprises applying of the order of 4 millilumens per square millimeter of light flux to the body in the vicinity of the non-ohmic contact, passing a current through the non-ohmic contact in the low conductivity direction, and superimposing a pulse of electrical energy on said current in the low conductivity direction simultaneously with the application of the light.

7. The method of permanently altering the electrical characteristics of a light responsive translator having a semiconductor body of one conductivity type, a base connection, and a restricted area, metallic, collector connection having an asymmetric conduction characteristic, which comprises applying electrical energy in the reverse direction of conduction to the collector connection, and applying light having a flux density of at least one millilumen per square millimeter in the vicinity of the collector connection simultaneously with the application of the electrical energy to the collector.

References Cited in the file of this patent

UNITED STATES PATENTS

| Number | Name | Date |
|---|---|---|
| 817,664 | Plecher | Apr. 10, 1906 |
| 1,418,362 | Coblentz | June 6, 1922 |